United States Patent [19]

Tooley et al.

[11] Patent Number: 4,994,247

[45] Date of Patent: Feb. 19, 1991

[54] PREPARATION OF CATALYST FOR OXIDATION OF CARBON MONOXIDE

[75] Inventors: Patricia A. Tooley, Bartlesville; John H. Kolts, Ochelata, both of Okla.

[73] Assignee: Phillips Petroleum Company, Bartlesville, Okla.

[21] Appl. No.: 404,726

[22] Filed: Sep. 8, 1989

[51] Int. Cl.$^5$ .................... B01D 53/36; B01J 21/06; B01J 23/46; B01J 23/89

[52] U.S. Cl. .................... 423/247; 423/213.5; 502/326

[58] Field of Search ............. 423/213.5, 247; 502/329

[56] References Cited

U.S. PATENT DOCUMENTS

| | | | |
|---|---|---|---|
| 3,513,109 | 5/1970 | Stiles | 502/241 |
| 3,737,492 | 6/1973 | Stander et al. | 264/43 |
| 3,905,918 | 9/1975 | Mai et al. | 502/303 |
| 4,105,590 | 8/1978 | Koberstein et al. | 502/151 |
| 4,117,082 | 9/1978 | Matsuyama | 423/247 |
| 4,207,209 | 6/1980 | Matsuda et al. | 423/213.5 |
| 4,239,658 | 12/1980 | Mitchell, III et al. | 502/302 |
| 4,350,613 | 9/1982 | Nishino et al. | 502/200 |
| 4,378,307 | 3/1983 | Brunelle et al. | 423/213.5 |
| 4,426,319 | 1/1984 | Blanchard et al. | 423/213.5 |
| 4,427,576 | 1/1984 | Dupin | 502/218 |
| 4,492,770 | 1/1985 | Blanchard et al. | 502/304 |
| 4,621,071 | 11/1986 | Blanchard et al. | 502/302 |
| 4,639,432 | 1/1987 | Holt et al. | 502/324 |
| 4,680,282 | 7/1987 | Blanchard et al. | 423/213.5 |
| 4,758,600 | 7/1988 | Arimitsu et al. | 502/302 |
| 4,868,148 | 9/1989 | Henk et al. | 423/213.5 |
| 4,940,686 | 7/1990 | Tooley et al. | 502/326 |

*Primary Examiner*—Jeffrey E. Russel
*Attorney, Agent, or Firm*—K. K. Brandes

[57] ABSTRACT

A composition of matter, effective as catalyst for CO oxidation with $O_2$ at about 20°-30° C., comprising iridium metal, iron oxide and titania is prepared by a process comprising impregnating a titania-containing support material with at least one iron compound and at least one iridium carbonyl compound, drying the thus impregnated material, and treating it with a reducing gas (preferably $H_2$).

33 Claims, No Drawings

4,994,247

PREPARATION OF CATALYST FOR OXIDATION OF CARBON MONOXIDE

BACKGROUND OF THE INVENTION

This invention relates to the catalytic oxidation of carbon monoxide to carbon dioxide. In another aspect, this invention relates to the catalytic oxidation of carbon monoxide, in particular under conditions suitable for laser applications. In still another aspect, this invention relates to a process for preparing CO oxidation catalyst compositions. In a further aspect, this invention relates to effective CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, in smoking articles, and in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Several patents, such as U.S. Pat. No. 4,639,432, disclose compositions useful as CO oxidation catalysts in $CO_2$ laser applications. However, there is an ever present need to develop new, effective CO oxidation catalyst compositions and improved processes for preparing effective CO oxidation catalyst compositions.

SUMMARY OF THE INVENTION

It is an object of this invention to provide a process for preparing a composition of matter which is effective as a catalyst for the oxidation of carbon monoxide. It is another object of this invention to provide a composition of matter which is effective as a catalyst for the oxidation of carbon monoxide with free oxygen. It is a further object of this invention to provide an effective process for catalytically reacting carbon monoxide with free oxygen to carbon dioxide. Other objects and advantages will be apparent from the detailed description and the claims.

In accordance with this invention, a process for preparing a composition of matter comprising (preferably consisting essentially of) Ir metal, Fe oxide and $TiO_2$ (effective as a catalyst composition for the oxidation of carbon monoxide to carbon dioxide by reaction with free oxygen at about 20°–30° C.) comprises the steps of (a) impregnating a titania-containing support material (preferably consisting essentially of titania) with at least one iron compound and at least one iridium carbonyl compound;

(b) substantially drying the material obtained in step (a); and (c) treating the material obtained in step (b) with a reducing gas (preferably a free hydrogen containing gas) under such conditions as to activate said material obtained in step (b), i.e., to make the material obtained in step (b) active as a catalyst for the reaction of CO and $O_2$ to $CO_2$ at about 20°–30° C., and to obtain the composition of matter defined above.

Also in accordance with this invention, there is provided a composition of matter comprising (preferably consisting essentially of) Ir metal, Fe oxide and $TiO_2$ (titania) having been prepared by the process comprising steps (a), (b) and (c), as described above.

Further in accordance with this invention, a process for oxidizing carbon monoxide comprises contacting a feed gas comprising CO and $O_2$ with a catalyst composition comprising (preferably consisting essentially of) Ir metal, Fe oxide and $TiO_2$, said catalyst composition having been prepared by a process comprising steps (a), (b) and (c), under such contacting conditions as to at least partially (preferably substantially) convert CO and $O_2$ to $CO_2$. Preferably, the CO oxidation reaction is carried out at about −50° to about 400° C., more preferably at about 10°–50° C.

DETAILED DESCRIPTION OF THE INVENTION

Any titania-containing support material can be used as the support material (i). Titania, the preferred support material, is commercially available. The method of preparation of titania is not considered critical. Titania can be prepared by flame hydrolysis of volatile titania compounds; or by precipitation from an aqueous solution of titanium compounds with an alkaline reagent, followed by washing, drying and calcining; and the like.

Generally the surface area (determined by the BET/$N_2$ method; ASTM D3037) of titania is in the range of from about 10 to about 300 $m^2/g$. Titania can have spherical, trilobal, quadrilobal or irregular shapes. When titania spheres are used, their diameter generally is in the range of from about 0.5 to about 5 mm. It is within the scope of this invention to have minor amounts (such as about 0.1–10 weight-%) of other refractory oxides (such as $Al_2O_3$, $SiO_2$) present, e.g., as binders.

It is within the scope of this invention to prepare suitable support materials by coating a porous ceramic material, such as a monolith (commercially available from Corning Glass Works, Corning, N.Y.), with titania. Other suitable porous ceramic support materials are glass frits, sintered alumina and the like. The choice of the ceramic material is determined by cost, pore structure, surface area, attrition resistance and similar factors. The porous ceramic material (preferably a monolith) can be impregnated with organic compounds of Ti (such as a titanium tetraalkoxide), hydrolyzed, dried and calcined. Or the porous ceramic material (preferably monolith) can be impregnated with a dispersion of titania particles, followed by drying and calcining.

Preferably, colloidal particles of titania having an average particle diameter of about 1 to about 100 nanometers, are dispersed in any suitable liquid dispersion medium, such as water, generally at a concentration of $TiO_2$ in the colloidal dispersion of about 0.1 to about 50 weight percent $TiO_2$. The weight ratio of colloidal dispersion of $TiO_2$ to the ceramic material is chosen so as to provide a $TiO_2$ content in the titania-coated ceramic material of about 1 to about 40 weight-% $TiO_2$.

The impregnation of the titania-containing support material (preferably consisting essentially of titania) with the Ir carbonyl compound and the Fe compound can be carried out in any suitable manner (either by the incipient wetness method or by spraying the solution onto the support, and the like). The impregnation of the support material can be carried out with one solution containing at least one dissolved iridium carbonyl compound and at least one iron compound. Or the impregnation can be carried out with separate solutions: one containing at least one Fe compound and another one containing at least one Ir carbonyl compound. These two separate solutions can then be applied substantially simultaneously or sequentially in any order, preferably first the solution with at least one Fe compound and then the solution with at least one Ir carbonyl compound. When sequential impregnation is carried out, it is preferred to heat the Fe-impregnated support material under such conditions as to substantially dry the Fe-impregnated support material and, optionally, to at least partially convert the iron compound to iron oxide (preferably at about 100°-500° C.), before the subsequent impregnation with the solution of at least one Ir carbonyl compound. It is also within the scope of this invention to repeat the simultaneous or sequential impregnations with the Fe and Ir compounds at least once.

Non-limiting examples of suitable Ir carbonyl compounds are $Ir_2(CO)_8$, $Ir_4(CO)_{12}$ (presently preferred), $HIr(CO)_4$, and the like, and mixtures thereof. Non-limiting examples of suitable Fe compounds are $Fe(NO_3)_2$, $Fe(NO_3)_3$, $Fe(HSO_4)_2$, $Fe(HSO_4)_3$, $FeSO_4$, $Fe_2(SO_4)_3$, $FeNH_4SO_4$, Fe(II) acetylacetonate, Fe(III) acetylacetonate (presently preferred), Fe(II) carboxylates (such as Fe(II) acetate), Fe(III) carboxylates (such as Fe(III) acetate), and the like, and mixtures thereof. Suitable solvents for the impregnating solution(s) comprising at least one Fe compound and at least one Ir carbonyl compound, include (but are not limited to) acid solutions (preferably concentrated nitric acid), and organic solvents (such as methanol, ethanol, propanol, and the like; acetone, methyl ethyl ketone and the like; methyl acetate, ethyl acetate, methyl propionate and the like). Water and dilute aqueous acid solutions are also suitable solvents for the Fe compounds (but are not suited for the Ir carbonyl compounds because of their very low solubility in these aqueous solvents).

Any suitable concentration of Ir and Fe in the impregnating solution(s) can be employed. Generally the concentration of Ir in the impregnating solution is about 0.05 to about 1 weight-% Ir, preferably about 0.1 to about 0.5 weight-% Ir. Generally, the concentration of Fe in the impregnating solution is about 0.1 to about 10 weight-% Fe, preferably about 0.5 to about 3 weight-% Fe. Any suitable weight ratio of impregnating solution(s) to titania-containing support material can be employed. Generally, this ratio is chosen such as to obtain a final composition of matter (after the subsequent drying and reducing steps) containing about 0.1-10 weight-% Ir, preferably about 0.2-5 weight-% Ir, and about 0.1-15 weight-% Fe, preferably about 0.2-5 weight-% Fe. Generally, the weight ratio of Fe to Ir is such that Fe oxide acts as copromoter for Ir metal in the catalytic oxidation of CO to $CO_2$ at about 20°-30° C. The above weight percentages are based on the composition of matter excluding any porous ceramic support material (such as monolith), if present.

Drying step (b) is generally carried out in an inert or oxidizing atmosphere, preferably a free oxygen containing gas atmosphere (such as air), generally at a temperature ranging from about 30° to about 200° C. (preferably about 50°-100° C.). Preferably, drying step (b) is carried out under reduced pressure conditions (i.e., 10-700 mm Hg), generally for about 0.5 to about 10 hours, so as to substantially dry the impregnated material obtained in step (a) (preferably under such conditions as to reduce the level of adhered and occluded solvent to less than about 10 weight-%).

Reducing step (c) can be carried out in any suitable manner at a temperature in the range of from about 0° to about 600° C., preferably from about 50° to about 300° C. Any reducing gas can be employed in reducing steps (c), such as a gas comprising $H_2$, CO, gaseous hydrocarbons such as methane, mixtures of the above, and the like. Preferably, a free hydrogen containing gas, more preferably substantially pure $H_2$, is employed. Reducing step (c) can be carried out for any suitable period of time suitable to activate the dried material obtained in the previous step, preferably for about 0.5 to about 20 hours. It is believed that iridium exists substantially as Ir metal after reducing step (c). However, insignificant amounts of oxides of Ir can also be present. It is believed that iron exists substantially in the oxidic forms (i.e., as FeO and/or $Fe_2O_3$ and/or $Fe_3O_4$). However, insignificant amounts of Fe metal can also be present (especially when the reduction is carried out at a relatively high temperature).

The process for oxidizing a carbon monoxide with free oxygen to carbon dioxide gas can be carried out at any suitable temperature and pressure conditions, for any suitable length of time, at any suitable gas hourly space velocity, and any suitable volume ratio of CO and $O_2$. The reaction temperature generally is in the range of from about $-50°$ to about 400° C., preferably from about $-30°$ to about 170° C., more preferably from about 10° to about 50° C. The pressure during the oxidation process generally is in the range of from about 1 to about 2,000 psia, more preferably from about 5 to about 20 psia. The volume ratio of CO to $O_2$ in the feed gas can range from about 1:100 to about 100:1, and preferably is in the range of about 1:10 to about 10:1. The volume percentage of CO and the volume percentage of $O_2$ in the feed gas can each be in the range of from about 0.05 to about 50, preferably from about 0.5 to about 3. The gas hourly space velocity (cc feed gas per cc catalyst per hour, measured at about 20° C./1 atm.) can be in the range of from about 1 to about 200,000, preferably from about 100 to about 30,000. It is understood that the calculation of the gas hourly space velocity is based on the volume occupied by any additional support material, such as a monolith material.

The feed gas can be formed in any suitable manner, e.g., by mixing CO, $O_2$ and optionally other gases such as $CO_2$, $N_2$, He and the like, such as in a carbon dioxide laser cavity. Or the feed gas can be an exhaust gas from a combustion engine, or it can be air that is to be inhaled by humans and contains undesirable levels of toxic carbon monoxide, and the like. The feed gas can be contacted in any suitable vessel or apparatus, such as in a laser cavity or in an exhaust pipe of a combustion engine, or in a gas mask used by humans, wherein the feed gas passes over the catalyst composition of this invention at the conditions described above. The CO oxidation process of this invention can be carried out in any suitable setting and for any purpose, e.g., for recombining CO and $O_2$ in $CO_2$ lasers, to oxidize CO contained in smoke or exhaust gases or air, and the like.

The following examples are presented in further illustration of the invention and are not to be construed as unduly limiting the scope of the invention.

EXAMPLE I

This example illustrates the experimental setup for testing the activity of noble metal catalysts for catalyzing the oxidation of carbon monoxide (so as to simulate catalytic recombination of CO and $O_2$ in $CO_2$ lasers). A gaseous feed blend comprising 1.2 volume-% CO, 0.6 volume-% $O_2$, 32 volume-% $CO_2$, 32 volume-% He and 34 volume-% $N_2$ was passed through a needle valve and a glass reactor in an upflow direction. The glass reactor tube had an inner diameter of about 6 mm and generally contained about 1.0 gram catalyst in a bed of about 2.5 cm height. The temperature in the catalyst bed was measured by means of a thermocouple inserted into the top layer of the catalyst bed. The CO content in the reactor effluent was determined by means of a Series 400 Anarad analyzer.

All tests were carried out at ambient conditions (about 23°–25° C., 1 atm.). Generally the temperature in the catalyst bed rose to about 25°–30° C. because of the generation of heat during the CO oxidation tests. The feed rate of the gaseous feed stream generally was in the range of about 200–400 cc/minute.

EXAMPLE II

The example illustrates the preparation of titania-supported catalyst compositions (to be tested for CO oxidation activity).

Catalyst A (Invention) contained 3.2 weight-% Ir and 0.8 weight-% Fe on titania ($TiO_2$). Catalyst A was prepared as follows: 5 grams of flame-hydrolyzed titania (provided by Degussa Corporation, Teterboro, N.J.; having a BET/$N_2$ surface area of about 50 $m^2/g$) was mixed, at room temperature, with a solution of 0.29 grams of iron (III) acetylacetonate in concentrated nitric acid. The obtained mixture was heated for 2 hours in air at 300° C. Thereafter a solution of 0.237 g $Ir_4(CO)_{12}$ in methanol was mixed with the Fe-impregnated titania. The mixture was stirred for 1 hour, and then dried at about 50° C. in a rotary vacuum evaporator. Prior to testing, catalyst A was treated with $H_2$ for 2 hours at 200° C.

Catalyst B (control) contained 2.8 weight-% Ir on titania (no Fe). It was prepared by mixing 5 grams of $TiO_2$ (provided by Degussa), which had been treated with $HNO_3$, with a solution of 0.2 grams of $Ir_4(CO)_{12}$ in about 50 cc methanol. The mixture was dried at about 50° C. in a rotary vacuum evaporator. Catalyst B was treated with $H_2$ before testing, as described for Catalyst A.

Catalyst C (Control) contained 2.8 weight-% Ir on $TiO_2$ and was prepared by mixing 5 g $TiO_2$ pellets with a solution of 0.2 g $IrO_2 \cdot 2H_2O$ in 4 cc concentrated $HNO_3$, followed by drying and calcining for 2 hours in air at 300° C. Catalyst C was treated with $H_2$ before testing, as described for Catalyst A.

Catalyst D (Control) contained 2.8 weight-% Ir and 0.8 weight-% Fe on $TiO_2$, and was prepared by mixing 2 grams of catalyst C (which had been calcined but not treated with $H_2$) with a solution of 0.12 g Fe(III) acetylacetonate in 1 cc concentrated $HNO_3$. The obtained mixture was calcined for 2 hours in air at 300° C. Catalyst D was treated with $H_2$ before testing, as described for Catalyst A.

EXAMPLE III

The Ir/$TiO_2$-containing catalyst compositions described in Example II were tested for CO oxidation activity in accordance with the procedure of Example I. Test results are summarized in Table I.

TABLE I

| Catalyst | Feed Rate (cc/Minute) | Hours on Stream | Conversion (% CO in Feed) | Conversion (cc CO/min/g Catalyst) |
|---|---|---|---|---|
| A | 400 | 1 | 75.0 | 3.60 |
| Ir/Fe/$TiO_2$ | " | 2 | 60.8 | 2.92 |
| (Invention) | " | 3 | 56.7 | 2.72 |
| | " | 4 | 50.0 | 2.40 |
| | " | 6 | 44.2 | 2.12 |
| | " | 8 | 39.2 | 1.88 |
| | " | 10 | 36.7 | 1.76 |
| | " | 12 | 35.0 | 1.68 |
| | " | 14 | 33.3 | 1.60 |
| | " | 16 | 31.7 | 1.52 |
| | " | 18 | 31.3 | 1.50 |
| D | 200 | 1 | 30.0 | 0.36 |
| Ir/Fe/$TiO_2$ (Control) | " | 2 | 25.8 | 0.31 |
| B Ir/$TiO_2$ (Control) | 200 | 1 | 0 | 0 |
| C Ir/$TiO_2$ (Control) | 200 | 1 | 0 | 0 |

NOTE:
2 grams of Catalyst D and 1 gram samples of Catalysts A, B and C were used in the above CO oxidation tests.

Test data in Table I clearly show that Ir/Fe oxide/titania Catalyst A, which had been prepared in accordance with this invention, was considerably more active than Ir/Fe oxide/titania Catalyst D, which had been prepared by a different process. Furthermore, Ir/$TiO_2$ catalysts without Fe were inactive as catalysts for CO oxidation at room temperature.

Reasonable variations, modifications and adaptations for various conditions and uses can be made within the scope of the disclosure and appended claims.

THAT WHICH IS CLAIMED IS:

1. A process for preparing a composition of matter, being effective as catalyst for the reaction of CO with $O_2$ to $CO_2$ at about 20°–30° C., comprising iridium metal, iron oxide and titania, said process comprising the steps of
   (a) impregnating a titania-containing support material with at least one iron compound and at least one iridium carbonyl compound;
   (b) substantially drying the material obtained in step (a); and
   (c) treating the substantially dried material obtained in step (b) with a reducing gas under such conditions as to activate said substantially dried material and to obtain said composition of matter.

2. A preparation process in accordance with claim 1, wherein said titania-containing support material is a titania-coated porous ceramic material.

3. A preparation process in accordance with claim 1, wherein said titania-containing support material consists essentially of titania.

4. A preparation process in accordance with claim 1, wherein said at least one iron compound is iron(III) acetylacetonate and said at least one iridium carbonyl compound is $Ir_4(CO)_{12}$.

5. A preparation process in accordance with claim 1, wherein step (a) is carried out with one solution containing said at least one iron compound and said at least one iridium carbonyl compound.

6. A preparation process in accordance with claim 1, wherein step (a) is carried out by impregnation of said support material with a solution comprising at least one iron compound, heating the obtained iron-impregnated support material under such conditions as to substantially dry said iron-impregnated support material, and then impregnating said substantially dried iron-impregnated support material with a solution comprising at least one iridium carbonyl compound.

7. A preparation process in accordance with claim 6, wherein said heating of the iron-impregnated support material is carried out at about 100°–500° C. under such conditions as to at least partially convert said at least one iron compound to iron oxide.

8. A preparation process in accordance with claim 1, wherein drying step (b) is carried out at about 30° to about 200° C.

9. A preparation process in accordance with claim 1, wherein reducing step (c) is carried out with hydrogen gas at a temperature of about 0° to about 600° C.

10. A preparation process in accordance with claim 1, wherein the composition of matter obtained in step (c) contains about 0.1–10 weight-% Ir and about 0.1–15 weight-% Fe.

11. A composition of matter, being effective as catalyst for the reaction of CO and $O_2$ to $CO_2$ at about 20°–30° C., comprising iridium metal, iron oxide and titania, said composition of matter having been prepared by a process comprising the steps of
  (a) impregnating a titania-containing support material with at least one iron compound and at least one iridium carbonyl compound;
  (b) substantially drying the material obtained in step (a); and
  (c) treating the substantially dried material obtained in step (b) with a reducing gas under such conditions as to activate said substantially dried material and to obtain said composition of matter.

12. A composition of matter in accordance with claim 11, wherein said titania-containing support material is a titania-coated porous ceramic material.

13. A composition of matter in accordance with claim 11, wherein said titania-containing support material consists essentially of titania.

14. A composition of matter in accordance with claim 11, wherein said at least one iron compound is iron(III) acetylacetonate and said at least one iridium carbonyl compound is $Ir_4(CO)_{12}$.

15. A composition of matter in accordance with claim 11, wherein step (a) is carried out with one solution containing said at least one iron compound and said at least one iridium carbonyl compound.

16. A composition of matter in accordance with claim 11, wherein step (a) is carried out by impregnation of said support material with a solution comprising at least iron compound, heating the obtained iron-impregnated support material under such conditions as to substantially dry said iron-impregnated support material, and then impregnating said substantially dried iron-impregnated support material with a solution comprising at least one iridium carbonyl compound.

17. A composition of matter in accordance with claim 11, wherein drying step (b) is carried out at about 30° to about 200° C.

18. A composition of matter in accordance with claim 11, wherein reducing step (c) is carried out with hydrogen gas at a temperature of about 0° to about 600° C.

19. A composition of matter in accordance with claim 11 comprising about 0.1–10 weight-% Ir and about 0.1–15 weight-% Fe.

20. A composition of matter in accordance with claim 11, consisting essentially of iridium metal, iron oxide, and titania as support material.

21. A process for oxidizing carbon monoxide comprising the steps of contacting a feed gas comprising carbon monoxide and free oxygen with a catalyst composition comprising iridium metal, iron oxide and a titania-containing support material, under such contacting conditions as to at least partially convert CO and $O_2$ to $CO_2$, wherein said catalyst composition has been prepared by a preparation process comprising the steps of
  (a) impregnating a titania-containing support material with at least one iron compound and at least one iridium carbonyl compound;
  (b) substantially drying the material obtained in step (a); and
  (c) treating the substantially dried material obtained in step (b) with a reducing gas under such conditions as to activate said substantially dried material and to obtain said catalyst composition.

22. A process for oxidizing carbon monoxide in accordance with claim 21, wherein said titania-containing support material is a titania-coated porous ceramic material.

23. A process for oxidizing carbon monoxide in accordance with claim 21, wherein said titania-containing support material consists essentially of titania.

24. A process for oxidizing carbon monoxide in accordance with claim 21, wherein said at least one iron compound is iron(III) acetylacetonate and said at least one iridium carbonyl compound is $Ir_4(CO)_{12}$.

25. A process for oxidizing carbon monoxide in accordance with claim 21, wherein step (a) is carried out with one solution containing said at least one iron compound and said at least one iridium carbonyl compound.

26. A process for oxidizing carbon monoxide in accordance with claim 21, wherein step (a) is carried out by impregnation of said support material with a solution comprising at least iron compound, heating the obtained iron-impregnated support material under such conditions as to substantially dry said iron-impregnated support material, and then impregnating said substantially dried iron-impregnated support material with a solution comprising at least one iridium carbonyl compound.

27. A process for oxidizing carbon monoxide in accordance with claim 21, wherein said heating of the iron-impregnated support material is carried out at about 100°–500° C. under such conditions as to at least partially convert said at least one iron compound to iron oxide.

28. A process for oxidizing carbon monoxide in accordance with claim 21, wherein drying step (b) is carried out at about 30° to about 200° C.

29. A process for oxidizing carbon monoxide in accordance with claim 21, wherein reducing step (c) is carried out with hydrogen gas at a temperature of about 0° to about 600° C.

30. A process for oxidizing carbon monoxide in accordance with claim 21, wherein said catalyst composition contains about 0.1-10 weight-% Ir and about 0.1-15 weight-% Fe.

31. A process for oxidizing carbon monoxide in accordance with claim 21, wherein said catalyst composition consists essentially of iridium metal, iron oxide and titania as support material.

32. A process for oxidizing carbon monoxide in accordance with claim 21, wherein said contacting conditions comprise a reaction temperature in the range of from about −50° to about 400° C. and a volume ratio of CO to $O_2$ in the feed gas in the range of from about 1:100 to about 100:1.

33. A process for oxidizing carbon monoxide in accordance with claim 32, wherein said contacting conditions comprise a reaction temperature in the range of from about −30° to about 170° C., a pressure in the range of from about 1 to about 2,000 psia, and a gas hourly space velocity of the feed gas in the range of from about 1 to about 200,000 cc/cc catalyst.

* * * * *